(12) United States Patent
Ma et al.

(10) Patent No.: US 10,044,971 B2
(45) Date of Patent: Aug. 7, 2018

(54) TELEVISION SET AND DESKTOP DISPLAY APPARATUS

(71) Applicant: BOE Technology Group Co., Ltd., Beijing (CN)

(72) Inventors: Yongda Ma, Beijing (CN); Hongfei Cheng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/787,688

(22) PCT Filed: Mar. 2, 2015

(86) PCT No.: PCT/CN2015/073513
§ 371 (c)(1),
(2) Date: Oct. 28, 2015

(87) PCT Pub. No.: WO2016/065783
PCT Pub. Date: May 6, 2016

(65) Prior Publication Data
US 2016/0255299 A1 Sep. 1, 2016

(30) Foreign Application Priority Data
Oct. 31, 2014 (CN) ...................... 2014 2 0642909 U

(51) Int. Cl.
H04N 5/63 (2006.01)
H04N 5/64 (2006.01)
G06F 1/26 (2006.01)

(52) U.S. Cl.
CPC ................. *H04N 5/63* (2013.01); *G06F 1/26* (2013.01); *H04N 5/64* (2013.01)

(58) Field of Classification Search
CPC ...................................................... H04N 5/63
(Continued)

(56) References Cited

U.S. PATENT DOCUMENTS 4,362,941 A * 12/1982 Castleman ........... G01N 27/622
250/381
4,368,409 A * 1/1983 Sivanesan ............. H04N 3/185
315/411
(Continued)

FOREIGN PATENT DOCUMENTS

CN 2805266 Y 8/2006
CN 101676825 A 3/2010
(Continued)

OTHER PUBLICATIONS

Jul. 17, 2015—International Search Report and Written Opinion Appn PCT/CN2015/073513 with English Tran.

*Primary Examiner* — Paulos M Natnael
(74) *Attorney, Agent, or Firm* — Banner & Witcoff, Ltd.

(57) ABSTRACT

There are provided a television set and a desktop display apparatus. The television set comprises a major structure configured to realize a display function, and further comprises: a power supply conversion means configured to convert AC mains into a DC voltage; a power supply allocation means disposed in the major structure and configured to convert the DC voltage output from the power supply conversion means into a DC operating voltage required by respective circuits in the major structure, wherein the power supply allocation means and the power supply conversion means are connected mutually and disposed separately. Since the major structure configured to realize the display function and the power supply conversion means configured to convert the AC mains into the DC voltage are disposed separately, electrical isolation of the DC voltage from the AC mains is realized, so that danger of electric shock of human body is avoided.

6 Claims, 2 Drawing Sheets

(58) Field of Classification Search
USPC .............................. 348/739, 730, 725, 723
See application file for complete search history.

(56) References Cited

U.S. PATENT DOCUMENTS

| | | | | | |
|---|---|---|---|---|---|
| 5,299,322 | A * | 3/1994 | Arai | ............... | G06F 9/4411 710/10 |
| 5,301,334 | A * | 4/1994 | Horiuchi | ............ | G06F 1/32 710/303 |
| 5,311,116 | A * | 5/1994 | Rogers | ............ | G01R 31/002 324/627 |
| 5,664,118 | A * | 9/1997 | Nishigaki | ........ | G06F 1/1632 710/304 |
| 6,046,914 | A * | 4/2000 | Lauter | ............ | H02M 1/4241 363/125 |
| 6,459,175 | B1 * | 10/2002 | Potega | ............ | B60L 11/185 307/132 M |
| 2005/0078422 | A1 * | 4/2005 | Pincu | ............ | G06F 1/263 361/62 |
| 2005/0116913 | A1 * | 6/2005 | Ha | ............ | G02F 1/133308 345/89 |
| 2006/0087800 | A1 * | 4/2006 | Savage | ............ | G06F 1/263 361/601 |
| 2006/0265732 | A1 * | 11/2006 | Nakanishi | ........ | H04N 5/60 725/136 |
| 2007/0010702 | A1 * | 1/2007 | Wang | ............ | A61F 2/82 600/8 |
| 2007/0273869 | A1 * | 11/2007 | Van Hout | ........ | G03F 7/70591 356/124 |
| 2008/0196936 | A1 * | 8/2008 | Yamamoto | ........ | H01R 25/006 174/520 |
| 2009/0103704 | A1 * | 4/2009 | Kitada | ............ | H04M 1/0291 379/167.14 |
| 2011/0159723 | A1 * | 6/2011 | Fukushima | ........ | H01R 13/6683 439/488 |
| 2013/0004673 | A1 * | 1/2013 | Ikeda | ............ | B05B 7/205 427/421.1 |

FOREIGN PATENT DOCUMENTS

| | | | |
|---|---|---|---|
| CN | 201860255 U | | 6/2011 |
| CN | 102523406 A | | 6/2012 |
| CN | 102790867 A | | 11/2012 |
| CN | 203757365 U | * | 8/2014 |
| CN | 204156972 U | | 2/2015 |

\* cited by examiner

TELEVISION SET AND DESKTOP DISPLAY APPARATUS

The application is a U.S. National Phase Entry of International Application No. PCT/CN2015/073513 filed on Mar. 2, 2015, designating the United States of America and claiming priority to Chinese Patent Application No. 201420642909.2 filed on Oct. 31, 2014. The present application claims priority to and the benefit of the above-identified applications and the above-identified applications are incorporated by reference herein in their entirety.

TECHNICAL FIELD

The present disclosure relates to a field of electronic device, in particular, to a television set and a desktop display apparatus.

BACKGROUND

With the development of television technology, a liquid-crystal television becomes gradually a main stream in television market due to its advantages of large screen, low thickness and high definition and so on. At present, a liquid-crystal television set is directly connected to mains via a power supply line in general, and converts alternative current (AC) mains inputted to the television set into a direct current (DC) voltage needed for respective circuits of the television set (such as signal circuit, illumination circuit, etc.) by means of a voltage conversion circuit inside the television set to provide operating power supply for the respective circuits in the television set.

As man-machine interaction deepens and touch screen television sets emerge in the market, the requirement for protection against electric shock of the television set is continuously increased. At present, the television set is directly connected to the mains mostly for use. Processes of rectifying from the mains to the operating voltage and voltage dropping are realized by the voltage conversion circuit integrated with the television set. As such, danger of electric shock of the human body would occur easily, in particular in the process of assembling the television set.

SUMMARY

There is provided in an embodiment of the present disclosure a television set, which is used to solve the problem that danger of human body electric shock would occur in the existing television set easily.

The television set provided in the embodiment of the present disclosure comprises a major structure configured to realize a display function, and further comprises:

a power supply conversion means configured to convert AC mains into a DC voltage;

a power supply allocation means disposed in the major structure and configured to convert the DC voltage output from the power supply conversion means into DC operating voltages required by respective circuits in the major structure, wherein the power supply allocation means and the power supply conversion means are connected mutually and disposed separately.

As an alternative implementation, an output terminal of the power supply conversion means and an input terminal of the power supply allocation means are connected in a pluggable mode.

As another alternative implementation, the output terminal of the power supply conversion means and the input terminal of the power supply allocation means are connected in a fixed mode.

Based on the above embodiment, the power supply conversion means is disposed within a screening can having an anti-radiation function.

In the television set provided in the present disclosure, since the major structure configured to realize the display function and the power supply conversion means configured to convert the AC mains into the DC voltage needed for the power supply allocation means in the major structure are disposed separately, electrical isolation of the DC voltage needed for the major structure of the television set from the AC mains is realized, so that danger of human body electric shock is avoided. In addition, the major structure of the television set and the power supply conversion means are disposed separately, so that heat dissipation burden of the major structure of the television set is reduced and the dissipation effect of the major structure of the television set is raised.

There is further provided in an embodiment of the present disclosure a desktop display apparatus, which is capable of solving the problem that danger of human body electric shock would occur in the existing desktop apparatus easily.

The desktop display apparatus provided in the embodiment of the present disclosure comprises a major structure configured to realize a display function, and further comprises:

a power supply conversion means configured to convert AC mains into a DC voltage;

a power supply allocation means disposed in the major structure and configured to convert the DC voltage output from the power supply conversion means into a DC operating voltage needed for respective circuits in the major structure, wherein the power supply allocation means and the power supply conversion means are connected mutually and disposed separately.

As an alternative implementation, an output terminal of the power supply conversion means and an input terminal of the power supply allocation means therebetween are connected in a pluggable mode.

As another alternative implementation, the output terminal of the power supply conversion means and the input terminal of the power supply allocation means therebetween are connected in a fixed mode.

Based on the above embodiment, the power supply conversion means is disposed within a screening can having an anti-radiation function.

In the desktop display apparatus provided in the present disclosure, since the major structure configured to realize the display function and the power supply conversion means configured to convert the AC mains into the DC voltage needed for the power supply allocation means in the major structure are disposed separately, electrical isolation of the DC voltage needed for the major structure of the desktop display apparatus from the AC mains is realized, so that danger of human body electric shock is avoided. In addition, the major structure of the desktop display apparatus and the power supply conversion means are disposed separately, so that heat dissipation burden of the major structure of the desktop display apparatus is reduced and the dissipation effect of the major structure of the desktop display apparatus set is raised.

DETAILED DESCRIPTION

In a television set (desktop display apparatus) of the present disclosure, the major structure configured to realize the display function and the power supply conversion means configured to convert the AC mains into the DC voltage required by the power supply allocation means in the major structure are disposed separately, thereby realizing electrical isolation of the DC voltage required by the major structure of the television set (desktop display apparatus) from the AC mains, so that the danger of electric shock of the 3human body is avoided.

Embodiments of the present disclosure will be further described below in detail by combining with accompanying figures of the specification. It shall be understood that the embodiments described herein are just used to describe and explaining principles of the present disclosure, but not used to limit the scope of the present disclosure.

Figure 1:
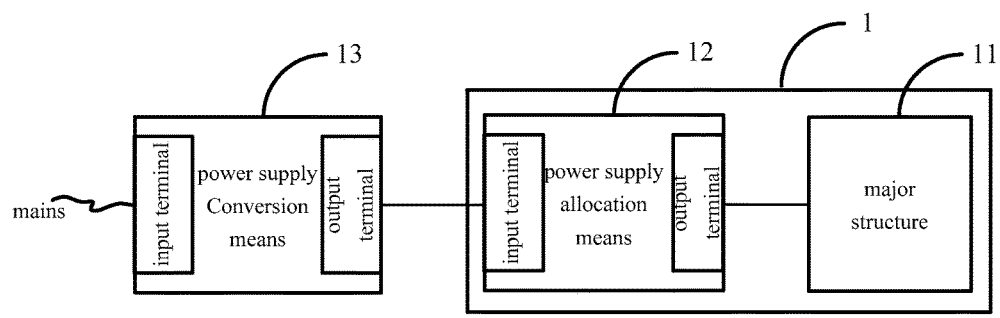
FIG. 1 is a schematic diagram of a configuration of a television set provided in an embodiment of the present disclosure.

FIG. 1 shows a schematic diagram of a configuration of a television set provided in an embodiment of the present disclosure. As shown in FIG. 1, the television set 1 comprises a major structure 11 configured to realize a display function, and further comprises:

a power supply conversion means 13 configured to convert AC mains into a DC voltage;

a power supply allocation means 12 disposed in the major structure 11 and configured to convert the DC voltage output from the power supply conversion means 13 into a DC operating voltage required by respective circuits in the major structure 11.

In the television set 1, the power supply allocation means and the power supply conversion means are connected mutually and disposed separately.

In the television set provided in the present disclosure, since the major structure configured to realize the display function and the power supply conversion means configured to convert the AC mains into the DC voltage required by the power supply allocation means in the major structure are disposed separately, electrical isolation of the DC voltage required by the major structure of the television set from the AC mains is realized, so that the danger of electric shock the human body is avoided. In addition, since the major structure of the television set and the power supply conversion means are disposed separately, heat dissipation burden of the major structure of the television set is reduced and the dissipation effect of the major structure of the desktop display apparatus set is raised.

Exemplarily, as an alternative implementation, an output terminal of the power supply conversion means 13 and an input terminal of the power supply allocation means 12 therebetween are connected in a pluggable mode.

Figure 2:
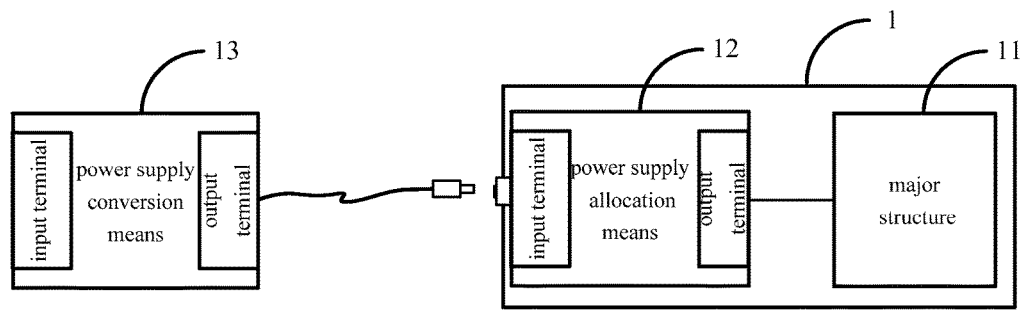
FIG. 2 is a schematic diagram of a configuration of another television set provided in an embodiment of the present disclosure.

FIG. 2 shows a schematic diagram of a configuration of another television set provided in an embodiment of the present disclosure. In FIG. 2, the output terminal of the power supply conversion means 13 and the input terminal of the power supply allocation means 12 can be connected in a pluggable mode. In this mode, when it is required to provide DC power supply for the major structure of the television set, it is necessary to connect the input terminal of the power supply conversion means with the mains and connect the output terminal of the power supply conversion means with the input terminal of the power supply allocation means; when it is not required to provide the DC power supply for the major structure of the television set, the input terminal of the power supply conversion means can be disconnected from the mains, and/or the output terminal of the power supply conversion means is disconnected from the input terminal of the power supply allocation means.

As another alternative implementation, the output terminal of the power supply conversion means and the input terminal of the power supply allocation means therebetween are connected in a fixed mode.

In this mode, the output terminal of the power supply conversion means is fixedly connected with the input terminal of the power supply allocation means, that is, the output terminal of the power supply conversion means and the input terminal of the power supply allocation means always keeps in a connecting state.

In this mode, when it is necessary to provide the DC power supply for the major structure of the television set, it is needed to connect the input terminal of the power supply conversion means with the mains; when it is not necessary to provide the DC power supply for the major structure of the television set, the input terminal of the power supply conversion means can be disconnected from the mains.

Based on the above any one of the embodiments, the power supply conversion means is disposed within a screening can having an anti-radiation function.

In order to achieve the effect of anti-radiation, an anti-radiation material can be coated on the inner wall of the screening can. For example, a metal material is coated on the inner wall of the screening can, so as to realize the purpose of anti-radiation, so that radiation released into the environment is reduced. Due to the use of the metal material, interference of radio wave can be reduced. Besides the coating mode, the mode of adding a lining layer can further be adopted. An anti-radiation layer is disposed within the screening can so as to function as radiation protection. Of course, except for the metal material, the anti-radiation material or the anti-radiation layer can further adopt other non-metal material capable of functioning as radiation protection.

Figure 3:
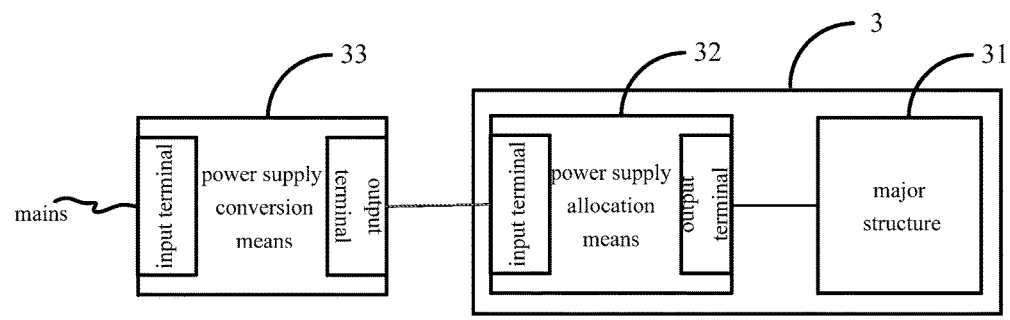
FIG. 3 is a schematic diagram of a configuration of a desktop display apparatus provided in an embodiment of the present disclosure.

FIG. 3 shows a schematic diagram of a configuration of a desktop display apparatus provided in an embodiment of the present disclosure. As shown in FIG. 3, the desktop display apparatus 3 comprises a major structure 31 configured to realize a display function, and a power supply allocation means 32 and a power supply conversion means 33 which are connected mutually and disposed separately.

The power supply conversion means 33 is configured to convert AC mains into a DC voltage required by the power supply allocation means 32.

The power supply allocation means 32 is disposed in the major structure 31 and configured to convert the DC voltage output from the power supply conversion means 33 into a DC operating voltage required by respective circuits in the major structure 31.

In the desktop display apparatus provided in the present disclosure, since the major structure configured to realize the display function and the power supply conversion means configured to convert the AC mains into the DC voltage required by the power supply allocation means in the major structure are disposed separately, electrical isolation of the DC voltage required by the major structure of the desktop display apparatus from the AC mains is realized, so that the danger of electric shock of the human body is avoided. In addition, since the major structure of the desktop display apparatus and the power supply conversion means are disposed separately, heat dissipation burden of the major structure of the desktop display apparatus is reduced and the dissipation effect of the major structure of the desktop display apparatus set is raised.

Exemplarily, as an alternative implementation, an output terminal of the power supply conversion means 33 and an input terminal of the power supply allocation means 32 therebetween are connected in a pluggable mode.

Figure 4:
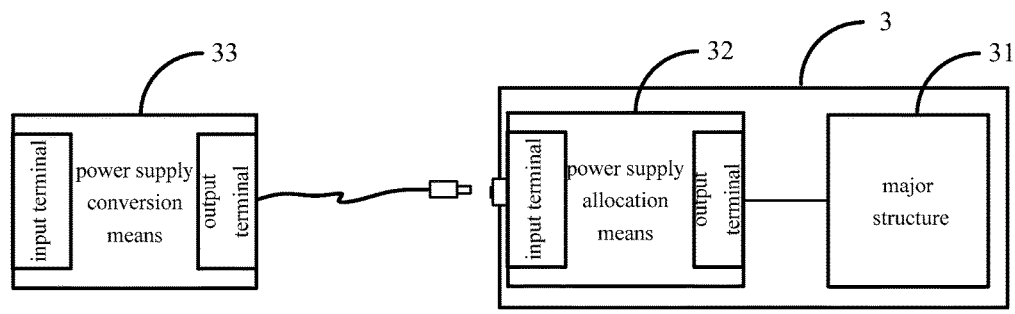
FIG. 4 is a schematic diagram of a configuration of another desktop display apparatus provided in an embodiment of the present disclosure.

FIG. 4 shows a schematic diagram of a configuration of another desktop display apparatus provided in an embodiment of the present disclosure. As shown in FIG. 4, in the desktop display apparatus, the output terminal of the power supply conversion means 33 and the input terminal of the power supply allocation means 32 can be connected by using a pluggable mode. In this mode, when it needs to provide DC power supply for the major structure of the desktop display apparatus, it is necessary to connect the input terminal of the power supply conversion means with the mains, and connect the output terminal of the power supply conversion means with the input terminal of the power supply allocation means; when it does not need to provide the DC power supply for the major structure of the desktop display apparatus, the input terminal of the power supply conversion means can be disconnected from the mains, and/or the output terminal of the power supply conversion means is disconnected from the input terminal of the power supply allocation means.

As another alternative implementation, the output terminal of the power supply conversion means and the input terminal of the power supply allocation means therebetween are connected in a fixed mode.

In this mode, the output terminal of the power supply conversion means is fixedly connected with the input terminal of the power supply allocation means, that is, the output terminal of the power supply conversion means and the input terminal of the power supply allocation means always keeps in a connecting state.

In this mode, when it is necessary to provide the DC power supply for the major structure of the desktop display apparatus, it is needed to connect the input terminal of the power supply conversion means with the mains; when it is not necessary to provide the DC power supply for the major structure of the desktop display apparatus, the input terminal of the power supply conversion means can be disconnected from the mains.

Based on any of the above embodiments, the power supply conversion means is disposed within a screening can having an anti-radiation function.

In order to achieve the effect of anti-radiation, an anti-radiation material can be coated on the inner wall of the screening can. For example, a metal material is coated on the inner wall of the screening can, so as to realize the purpose of anti-radiation, so that radiation released into the environment is reduced. Due to the use of the metal material, interference of radio wave can be reduced. Besides the coating mode, the mode of adding a lining layer can further be adopted. An anti-radiation layer is disposed within the screening can so as to function as radiation protection. Of course, except for using the metal material, the anti-radiation material or the anti-radiation layer can further adopt other non-metal material being capable of functioning as radiation protection.

It shall be noted that the present disclosure is described by taking the television set and the desktop display apparatus as an example, which does not limit the application scope of the present disclosure, that is, the present disclosure is not only limited to be applied in the television set and the desktop display apparatus. All the electronic devices integrated with the power supply conversion circuit (i.e., dropping the voltage of the mains and regulating the voltage to obtain a low voltage DC power supply) can adopt the solution provided in the present disclosure to electrically isolate the power supply conversion circuit from the electronic device, so as to avoid the danger of electric shock of the human body.

Although alternative embodiments of the present disclosure have been already described, those skilled in the art can make additional alternations and amendments to these embodiments once they know a basic inventive concept. Therefore, the claims intend to be explained as including alternative embodiments and all alternations and amendments that fall into the scope of the present disclosure.

Obviously, those skilled in the art can make various alternations and modifications to the present disclosure without departing from the spirit and scope of the present disclosure. As such, the present disclosure intends to include these alternations and modifications if these alternations and modifications fall into the scope of the claims of the present disclosure as well as their equivalent technology.

The present application claims the priority of a Chinese patent application No. 201420642909.2 filed on Oct. 31, 2014. Herein, the content disclosed by the Chinese patent application is incorporated in full by reference as a part of the present disclosure.

What is claimed is:

1. A television set, comprising a major structure configured to realize a display function, and further comprising:
   a power supply conversion means disposed outside of the major structure and configured to convert AC mains into a DC voltage; and
   a power supply allocation means disposed in the major structure and configured to convert the DC voltage output from the power supply conversion means into DC operating voltages required by respective circuits in the major structure,
   wherein the power supply allocation means and the power supply conversion means are connected mutually and disposed separately,
   wherein the power supply conversion means is disposed within a screening can, and an anti-radiation material is coated on an inner wall of the screening can, and
   wherein an anti-radiation layer is disposed within the screening can by adopting at least one of a coating mode and a mode of adding a lining layer.

2. The television set according to claim 1, wherein an output terminal of the power supply conversion means and an input terminal of the power supply allocation means are connected in a pluggable mode.

3. The television set according to claim 1, wherein an output terminal of the power supply conversion means and an input terminal of the power supply allocation means are connected in a fixed mode.

4. A desktop display apparatus comprising a major structure configured to realize a display function, and further comprising:
- a power supply conversion means disposed outside of the major structure and configured to convert AC mains into a DC voltage; and
- a power supply allocation means disposed in the major structure and configured to convert the DC voltage output from the power supply conversion means into a DC operating voltage required by respective circuits in the major structure,
- wherein the power supply allocation means and the power supply conversion means are connected mutually and disposed separately,
- wherein the power supply conversion means is disposed within a screening can, and an anti-radiation material is coated on an inner wall of the screening can, and
- wherein an anti-radiation layer is disposed within the screening can by adopting at least one of a coating mode and a mode of adding a lining layer.

5. The desktop display apparatus according to claim 4, wherein an output terminal of the power supply conversion means and an input terminal of the power supply allocation means therebetween are connected in a pluggable mode.

6. The desktop display apparatus according to claim 4, wherein an output terminal of the power supply conversion means and an input terminal of the power supply allocation means therebetween are connected in a fixed mode.

* * * * *